ic compositions. In one aspect, the invention relates
to fluorine-containing copolymeric compositions. More
particularly, in this aspect, the invention relates to co-
polymeric fluorobutadiene compositions and the method
for their manufacture.

2,996,487
FLUOROBUTADIENE COPOLYMERS
Archibald N. Bolstad, Maplewood, N.J., and John M. Hoyt, Woodside, N.Y., assignors, by mesne assignments, to Minnesota Mining and Manufacturing Company, St. Paul, Minn., a corporation of Delaware
No Drawing. Filed Oct. 30, 1956, Ser. No. 619,108
8 Claims. (Cl. 260—87.7)

This invention relates to halogen-containing copolymeric compositions. In one aspect, the invention relates to fluorine-containing copolymeric compositions. More particularly, in this aspect, the invention relates to copolymeric fluorobutadiene compositions and the method for their manufacture.

It is an object of this invention to provide new and useful fluorine-containing copolymeric compositions having desirable chemical and physical characteristics.

Another object of this invention is to provide new and useful fluorobutadiene copolymeric compositions, which possess elastomeric properties, together with good chemical and physical characteristics, and which can be easily fabricated into a wide variety of useful articles of improved chemical and physical stability.

Still another object of this invention is to provide new and useful copolymeric fluorobutadiene compositions which can serve as protective coatings having the aforementioned characteristics, and which can readily be applied to the surfaces of a wide variety of useful articles.

A still further object of this invention is to provide a process for producing these copolymeric compositions in good yields.

Various other objects and advantages inherent in the invention will become apparent to those skilled in the art from the accompanying description and disclosure.

It has now been found that the copolymerization of fluorobutadienes having from two to five fluorine atoms and a chloroethylene, under the conditions more fully hereinafter described, produces elastomeric copolymeric compositions possessing good chemical and physical stability, and good resistance to oils, fuels and various strong chemical reagents. These copolymeric products of the aforementioned fluorobutadiene and the chloroethylene, constitute valuable macromolecules and are adaptable to a wide variety of commercial uses. They possess low-temperature flexibility, in addition to the aforementioned properties of good chemical and physical stability, and resistance to oils and hydrocarbon fuels. They are also selectively soluble in various commercial solvents and serve as durable, flexible, protective coatings on surfaces which are subjected to environmental conditions in which they may come into contact with any of the aforementioned corrosive substances.

As indicated above, the copolymers of the present invention are produced by polymerizing a fluorobutadiene having from two to five fluorine atoms and a chloroethylene. Preferred fluorobutadienes include 1,1-difluorobutadiene; 1,1,2-trifluorobutadiene; 1,1,3-trifluorobutadiene; and 1,1,2,4,4-pentafluorobutadiene. Preferred chloroethylenes include vinyl chloride and vinylidene chloride.

In general, as more fully hereinafter described, the copolymeric compositions of the present invention are produced from the polymerization of monomeric mixtures containing the fluorobutadiene and the chloroethylene at temperatures between about −20° C. and about 150° C., with intermediate temperature ranges being selected with reference to the specific polymerization system employed. The most useful copolymeric compositions are produced from monomeric mixtures containing between about 2 mole percent and about 90 mole percent of the fluorobutadiene and the remaining major constituent being the chloroethylene. The preferred copolymeric compositions of the present invention are copolymers produced from monomeric mixtures containing between about 10 mole percent and about 50 mole percent of the fluorobutadiene and the remaining major constituent being the chloroethylene.

In producing copolymeric compositions from the aforementioned monomeric mixtures containing between about 2 mole percent and about 90 mole percent of the fluorobutadiene and the remaining major constituent being the aforementioned chloroethylene, it is found that the finished copolymeric product contains between about 5 mole percent and about 95 mole percent of the fluorobutadiene and the remaining major constituent being the chloroethylene. In producing copolymeric compositions from the aforementioned monomeric mixtures containing between about 10 mole percent and about 50 mole percent of the fluorobutadiene and the remaining major constituent being the chloroethylene, it is found that the finished copolymeric product contains between about 25 mole percent and about 85 mole percent of the fluorobutadiene and the remaining major constituent being the chloroethylene.

The copolymeric compositions of the present invention are preferably prepared by carrying out the polymerization reaction in the presence of a free radical-forming promoter. For this purpose, the polymerization reaction is carried out by employing a water-soluble peroxy-type initiator in a water-suspension type recipe or an organic peroxide initiator in a bulk-type system. The water-suspension type recipe is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt, such as ferrous sulfate or ferrous nitrate to accelerate the copolymerization reaction. The water-soluble initiator present in the water-suspension type recipe system comprises between about 0.1 and about 5 parts per weight per 100 parts of total monomers present. The variable-valence metal salt is preferably employed in an amount between about 0.01 and about 0.2 part by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is desirable to employ an emulsifying agent. This emulsifying agent is present either in the form of an aliphatic metal acid-salt having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above-mentioned water-suspension type recipe systems, are polyfluorocarboxylic acids (e.g., perfluorooctanoic acid) or perfluorochlorocarboxylic acid salts (e.g., trifluorochloroethylene telomer acid soaps). The polyfluorocarboxylic acids which may be employed are such as those disclosed in U.S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those being disclosed in co-pending application Serial No. 501,782, filed April 18, 1955, as being useful dispersing agents in polymerization reactions. In general, these emulsifying agents are present in an amount between about 0.05 and about 10 parts by weight per 100 parts of total monomers present.

The polymerization reaction is preferably conducted under neutral conditions, in order to prevent gelling of the resulting polymeric product, a condition which often causes slowdown or stoppage of the polymerization reaction. In this respect, it should be noted that it is sometimes necessary to maintain the pH of the system at a pH of about 7.0 by the addition of suitable buffer agents. Typical examples are sodium borate and disodium phosphate.

As indicated above, the polymerization reaction may also be carried out with the initiator being present in the form of an organic peroxide in a bulk-type polymerization system. Of these organic peroxide promoters, halogen-substituted peroxides are most desirable. A preferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, chloroacetyl peroxide, 2,4-dichlorobenzoyl peroxide, dichlorofluoroacetyl peroxide, benzoyl peroxide and ditertiary butyl peroxide.

As previously indicated, the polymerization reaction is carried out, in general, at a temperature between about −20° C. and about 150° C. When the polymerization reaction is carried out employing a water-suspension type recipe, temperatures between about 0° C. and about 100° C. are preferably employed. When the polymerization reaction is carried out in the presence of an organic peroxide initiator in a bulk-type polymerization system, temperatures over the entire range of between about −20° C. and about 150° C. are preferably employed depending upon the decomposition temperature of the promoter. The polymerization reactions described herein to produce the polymeric compositions of the present invention are carried out under autogenous conditions of pressure. These pressures may vary from about atmospheric pressure to as high as 2000 pounds per square inch. However, in general, these pressures do not rise above approximately 500 pounds per square inch.

As previously indicated, the copolymers of the present invention are particularly suitable and useful for the fabrication of a wide variety of materials having high desirable physical and chemical properties. In this respect, the copolymers of the present invention possess important utility in the fabrication of resilient gaskets, seals, valve-diaphragms, films and various other commercial applications. Another important use of the copolymers of the present invention is in the form of durable, flexible, protective coatings on surfaces which are subjected to distortion in normal uses, e.g., fabric surfaces. For these purposes, the copolymers of the present invention may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces their solubility, without affecting, unduly, the overall yield. Suitable polymerization modifiers include chloroform ($CHCl_3$), Freon-113 ($CF_2ClCFCl_2$), carbon tetrachloride ($CCl_4$), trichloroacetyl chloride $$CCl_3COCl$$

bromotrichloromethane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction. Chloroform is preferred.

The following examples are offered for a better understanding in producing the copolymeric compositions of the present invention and are not to be construed as limiting its scope.

*Example I*

A heavy-walled, glass polymerization tube of about 20 ml. capacity was flushed with nitrogen and then charged with 9 cc. of a catalyst solution prepared by dissolving 25 grams of potassium stearate and 1.5 grams of dodecyl mercaptan in 900 cc. of water, adjusted to a pH of 10 by the addition of potassium hydroxide. The contents of the tube were then frozen and the tube was then charged with 1 cc. of a catalyst solution prepared by dissolving 1.5 grams of potassium persulfate in 100 cc. of water. The contents of the tube were next refrozen, and the tube was then connected to a gas-transfer system and evacuated at liquid nitrogen temperature. To the frozen contents of the tube were added, by distillation, 1.78 grams of 1,1-difluorobutadiene and 3.22 grams of vinyl chloride, comprising a comonomeric mixture containing 50 mole percent of each monomer. After the contents of the tube were thoroughly frozen with liquid nitrogen, the tube was evacuated and sealed.

The polymerization tube and its contents were next agitated in a temperature-regulated water-bath at 50° C. for a period of 24 hours. At the end of this time, the contents of the tube were coagulated by freezing. The coagulated product was then removed from the tube, washed with hot water and then dried to constant weight in vacuo at 35° C. A rubbery copolymeric product was obtained which was found, upon analysis, to comprise approximately 79 mole percent 1,1-difluorobutadiene and the remaining major constituent, vinyl chloride, being present in an amount of approximately 21 mole percent. The copolymer was obtained in an amount corresponding to a 27% conversion, and was found to have a 59% volume increase for the raw copolymer, in ASTM Fuel Type II, consisting of isooctane (60% by volume) benzene (5% by volume), toluene (20% by volume) and xylene (15% by volume).

*Example II*

Employing the procedure set forth in Example I and the same polymerization system, the tube was charged with 2.25 grams of 1,1-difluorobutadiene and 2.43 grams of vinylidene chloride, comprising a comonomeric mixture containing 50 mole percent of each monomer.

The polymerization reaction was carried out at a temperature of 50° C. for a period of 22 hours. The resultant elastomeric product was worked-up in accordance with the same procedure as set forth in Example I. A rubbery product was obtained and, upon analysis, was found to compromise approximately 66 mole percent 1,1-difluorobutadiene and the remaining major constituent, vinylidene chloride, being present in an amount of approximately 34%. The copolymer was obtained in an amount corresponding to a 43% conversion.

*Example III*

A heavy-walled, glass polymerization tube of about 2 ml. capacity was flushed with nitrogen and then charged with 5 cc. of a solution prepared by dissolving 0.1 gram of dodecyl mercaptan and 6 grams of the ammonium salt of perfluorooctanoic acid in 100 cc. of water. The contents of the tube were then frozen, and the tube was then charged with 1 cc. of a promoter solution prepared by dissolving 0.4 gram of sodium metabisulfite and 0.5 gram of borax in 20 cc. of water. The contents of the tube were then refrozen. To the contents of the tube were next charged 4 cc. of a solution prepared by dissolving 1 gram of potassium persulfate in 80 cc. of water. The contents of the tube were then refrozen, and the tube was next connected to a gas-transfer system and evacuated at liquid nitrogen temperature. To the frozen contents of the tube were added, by distillation, 0.432 gram of 1,1,2,4,4-pentafluorobutadiene and 1.5 grams of vinyl chloride, comprising a comonomeric mixture containing 11 mole percent of 1,1,2,4,4-pentafluorobutadiene and 89 mole percent of vinyl chloride. After the contents of the tube were thoroughly frozen in liquid nitrogen, the tube was evacuated and sealed. The 1,1,2,4,4-pentafluorobutadiene is prepared as follows: 1-chloro-1,2-dibromo-1,2,2-trifluoroethane, $$CF_2BrCFClBr$$

is added to vinylidene fluoride to yield $$CF_2BrCFClCH_2CF_2Br$$

which is then dehydrobrominated using potassium hydroxide, followed by debromochlorination using zinc to yield $CF_2=CF-CH=CF_2$, B.P. 15.0° C.–15.5° C.

The polymerization tube and its contents were next agitated in a temperature-regulated water-bath at 50° C. for a period of 40 hours. At the end of this time, the contents of the tube were coagulated by freezing. The coagulated product was then removed from the tube, washed with hot water and then dried to constant weight in vacuo at 35° C. A copolymeric product was obtained which was found, upon analysis, to comprise approximately 6.5 mole percent 1,1,2,4,4-pentafluorobutadiene and the remaining major contsituent, vinyl chloride, being present in an amount of approximately 93.5 mole percent. The copolymer was obtained in an amount corresponding to a 59% conversion.

*Example IV*

A heavy-walled, glass polymerization tube of about 20 ml. capacity was flushed with nitrogen and then charged with 5 cc. of a solution prepared by admixing 0.2 gram of dodecyl mercaptan and 5 grams of potassium stearate in 100 cc. of water, adjusted to a pH of 11 by the addition of potassium hydroxide. The contents of the tube were next frozen and the tube was then charged with 4 cc. of a solution prepared by dissolving 1 gram of potassium persulfate in 80 cc. of water. The contents of the tube were then refrozen and the tube was then charged with 1 cc. of a solution prepared by dissolving 0.4 gram of sodium metabisulfite and 0.5 gram of borax in 20 cc. of water. The contents of the tube were then refrozen, and the tube was next connected to a gas-transfer system and evacuated at liquid nitrogen temperature. To the frozen contents of the tube were added, by distillation, 3.17 grams of 1,1,2-trifluorobutadiene and 1.84 grams of vinyl chloride, comprising a comonomeric mixture containing 50 mole percent of each monomer. After the contents of the tube were thoroughly frozen with liquid nitrogen, the tube was evacuated and sealed. The 1,1,2-trifluorobutadiene monomer was obtained by adding dibromodifluoromethane to 1-fluoropropene to produce the adduct, $CF_2BrCHFCHBrCH_3$, which, upon dehydrobromination, yielded $CF_2=CF-CH=CH_2$, B.P. 4.8° C.–8.0° C. 1-fluoropropene was prepared by the following series of reactions:

(1) $CHCl=CHCH_3+Br_2 \xrightarrow{R.T.} CHClBrCHBrCH_3$ (2) $CHClBrCHBrCH_3+HF/HgO \xrightarrow[\text{R.T.; 18 hours}]{\text{sealed bomb}} CHClFCHBrCH_3$ (3) $CHClFCHBrCH_3+Zn \xrightarrow[\text{R.T.}]{\text{n-propanol}} CHF=CHCH_3$ The polymerization tube and its contents were next agitated in a temperature-regulated water-bath at 50° C. for a period of 23 hours. At the end of this time, the contents of the tube were coagulated by freezing. The coagulated product was then removed from the tube, washed with hot water and then dried to constant weight in vacuo at 35° C. A rubbery copolymeric product was obtained which was found, upon analysis, to comprise approximately 82.5 mole percent 1,1,2-trifluorobutadiene, and the remaining major constituent, vinyl chloride, being present in an amount of approximately 17.5 mole percent. The copolymer was obtained in an amount corresponding to a 66% conversion.

A sample of the raw copolymer was compression molded at 350° F. for a period of 10 minutes. After molding, the sample retained its rubbery characteristics. A volume increase of 77.7% was observed in the molded sample when tested in ASTM Type II Fuel. Gehman stiffness of the molded sample of raw copolymer, determined according to ASTM designation, D–1053–49T, was as follows:

$$T_5 = -9.5° \text{ C.}; \quad T_{10} = -20° \text{ C.}$$

*Example V*

Employing the procedure set forth in Example IV and the same polymerization system, the tube was charged with 3.17 grams of 1,1,3-trifluorobutadiene and 1.83 grams of vinyl chloride, which comprised a comonomeric mixture containing 50 mole percent of each monomer.

The 1,1,3-trifluorobutadiene monomer was obtained by adding dibromodifluoromethane to 2-fluoropropene to produce the adduct, $CF_2BrCH_2CFBrCH_3$, which was then dehydrobrominated at about 150° C. using tri-n-butyl amine to yield $CF_2=CH-CF=CH_2$, B.P. 17.5° C.–19.4° C. 2-fluoropropene was prepared by the following series of reactions:

(1) $CH_2ClCHClCH_3+KOH \longrightarrow CH_2=CClCH_3+CHCl=CHCH_3$ (2) $CH_2=CClCH_3+HF \longrightarrow CH_3CFClCH_3$ (3) $CH_3CFClCH_3 \xrightarrow[\text{ethanol}]{\text{KOH: 95 percent}} CH_2=CF-CH_3$ The polymerization reaction was carired out at a temperature of 50° C. for a period of 23 hours. The resultant elastomeric product was worked-up in accordance with the same procedure as set forth in Example I. A rubbery product was obtained and, upon analysis, was found to comprise approximately 76.5 mole percent 1,1,3-trifluorobutadiene, and the remaining major constituent, vinyl chloride, being present in an amount of aproximately 23.5 mole percent. The copolymer was obtained in an amount corresponding to a 33% conversion.

As previously indicated, the polymeric compositions of the present invention possess highly desirable physical and chemical properties which make them useful for the fabrication of a wide variety of thermoplastic articles, or for the application to various surfaces as protective coatings. In such uses, a raw elastomeric copolymer, such as is produced in accordance with the procedure set forth in the above examples, is extruded or pressed into sheets at temperatures between about 250° F. and about 400° F. and at a pressure between about 500 and about 15,000 pounds per square inch for a period of about 5 to about 60 minutes. Thereafter, various articles can be molded from preforms out from sheets and extruded stock in the form of gaskets, diaphragms, packings, etc. In this respect, it is preferred in such applications, that the raw copolymer also include various vulcanizing agents and fillers.

When employed as protective coatings on any of the surfaces previously described, the raw copolymeric composition is dissolved in any of the aforementioned solvents and is applied to the desired surfaces, employing such apparatus as a knife-spreader or a doctor-blade or a reverse-roll coater. The solvent, after the copolymeric coating composition has been applied to the surface, is permitted to evaporate. This may also be accomplished in the presence of elevated temperatures, if so desired. In many applications, it is desirable to include in the copolymeric coating composition, various vulcanizing agents. In the latter case, supplementary heat treatment of the coating is required, either during the solvent-removal step or thereafter. After the solvent has been completely evaporated, the coated surface is ready for use. In this respect, it should be noted that the polymeric coating composition may be applied to the surface either as a single coating or, if so desired, the protective coating may be built-up by the application of several layers, each layer being permitted to harden by solvent evaporation before the next layer is applied. Furthermore, if so desired, the protective coatings, or the polymeric composition, when obatined in the form of sheets, may be suitably pigmented.

Other uses for the polymeric compositions of the present invention reside in the fabrication of belting, hose, mountings, piston and pump valves, sheet and valve-disks, rolls, tubing, pressure-sensitive tape for electrical insulation purposes, grommets, or as adhesives for fastening a rubber surface to a metal or another rubber surface.

Since certain changes may be made in carrying out the process of the present invention in producing the desired polymeric compositions without departing from the scope of the invention, it is intended that all matter contained in the above description is to be interpreted as illustrative and not in a limiting sense.

We claim:
1. An elastomeric copolymer of between about 5 and about 95 mol percent of 1,1-difluorobutadiene and correspondingly between about 95 and 5 percent of a chloroethylene selected from the group consisting of vinyl chloride and vinylidene chloride.
2. The elastomeric copolymer of claim 1 wherein the chloroethylene is vinyl chloride.
3. The elastomeric copolymer of claim 1 wherein the chloroethylene is vinylidene chloride.
4. An elastomeric copolymer of between about 5 and 95 mol percent of 1,1,2,4,4-pentafluorobutadiene and correspondingly between about 95 and 5 mol percent of a chloroethylene selected from the group consisting of vinyl chloride and vinylidene chloride.
5. The elastomeric copolymer of claim 4 in which the chloroethylene is vinyl chloride.
6. The elastomeric copolymer of claim 4 in which the chloroethylene is vinylidene chloride.
7. A process which comprises polymerizing a mixture of between about 2 and about 90 mol percent of 1,1-difluorobutadiene and correspondingly between about 98 and about 10 mol percent of a chloroethylene selected from the group consisting of vinyl chloride and vinylidene chloride, said polymerization being effected at a temperature between about −20° C. and about 150° C. and in contact with a free radical forming polymerization initiator.
8. A process which comprises polymerizing a mixture of between about 2 and about 90 mol percent of 1,1,2,4,4-pentafluorobutadiene and correspondingly between about 98 and about 10 mol percent of a chloroethylene selected from the group consisting of vinyl chloride and vinylidene chloride, said polymerization being effected at a temperature between about −20° C. and about 150° C. and in contact with a free radical forming polymerization initiator.

References Cited in the file of this patent
UNITED STATES PATENTS

| | | |
|---|---|---|
| 2,479,567 | Joyce et al. | Aug. 16, 1949 |
| 2,647,110 | Wiseman | July 28, 1953 |
| 2,668,182 | Miller | Feb. 2, 1954 |
| 2,686,207 | Crane et al. | Aug. 10, 1954 |
| 2,716,141 | Miller | Aug. 23, 1955 |
| 2,742,454 | Rearick et al. | Apr. 17, 1956 |
| 2,750,431 | Tarrant et al. | June 12, 1956 |
| 2,783,219 | Passino et al. | Feb. 26, 1957 |
| 2,837,505 | Dittman et al. | June 3, 1958 |
| 2,842,528 | Herbst et al. | July 8, 1958 |